United States Patent [19]

Shintani et al.

[11] Patent Number: 5,696,565
[45] Date of Patent: Dec. 9, 1997

[54] DEMAGNETIZING DEVICE IS AUTOMATICALLY ENERGIZED AFTER COUNTING A SET NUMBER OF POWER-ON OPERATIONS OF A CATHODE RAY TUBE

[75] Inventors: Peter Shintani, Tokyo; Naomasa Takahashi, Chiba, both of Japan

[73] Assignee: Sony Corporation, Tokyo, Japan

[21] Appl. No.: 567,988

[22] Filed: Dec. 11, 1995

[30] Foreign Application Priority Data

Dec. 15, 1994 [JP] Japan .................. P06-332915

[51] Int. Cl.$^6$ .................. H04N 9/29; H04N 5/65
[52] U.S. Cl. .................. 348/820; 315/8; 315/85; 361/150
[58] Field of Search .................. 361/150; 348/820; 315/8, 85; H04N 9/29, 5/65

[56] References Cited

U.S. PATENT DOCUMENTS

| | | | |
|---|---|---|---|
| 4,458,178 | 7/1984 | Tenney et al. | 315/8 |
| 4,769,577 | 9/1988 | Morrish | 315/8 |
| 5,168,195 | 12/1992 | Breidigan et al. | 315/8 |
| 5,179,315 | 1/1993 | Lonoce et al. | 361/150 |
| 5,475,283 | 12/1995 | Yoshida | 315/8 |

FOREIGN PATENT DOCUMENTS

4132486   5/1992   Japan.

*Primary Examiner*—Glenton B. Burgess
*Attorney, Agent, or Firm*—Jay H. Maioli

[57] ABSTRACT

A CPU is designed so as to put a demagnetizing circuit in an operative state in accordance with a result of detecting, among other quantities or events, the number of operations to turn on a power counted by a counter, the lapse of time under a predetermined condition measured by a timer since the pulling-out of an AC plug, the movement of the main body of a display device sensed by a sensor unit, an external magnetic field sensed by a sensor unit or a residual magnetism in a CRT itself sensed by a sensor unit. Instead of carrying out demagnetization each time the power is turned on, demagnetization is performed only under certain conditions when necessary, diminishing the problem of wasteful power consumption. On the top of that, the number of cases in which sound and picture vibration are generated due to a demagnetizing operation carried out right after the turning-on of the power is reduced, resulting in a product easy to handle by the user. In addition, the lives of components composing a demagnetizing circuit such as a positive thermistor can be prolonged.

4 Claims, 7 Drawing Sheets

DEMAGNETIZING DEVICE IS AUTOMATICALLY ENERGIZED AFTER COUNTING A SET NUMBER OF POWER-ON OPERATIONS OF A CATHODE RAY TUBE

BACKGROUND OF THE INVENTION

1. Field of the Invention

The present invention relates to a display device equipped with a CRT serving as a display unit and a demagnetizing circuit for demagnetizing the CRT.

2. Description of Related Art

In the case of a display unit employed in display device such as a television receiver for displaying pictures by means of a CRT and a monitor apparatus employed in a computer, the CRT itself is affected by the earth magnetism and other kinds of external magnetism, causing typically an aperture grill and CRT fastening metal fittings thereof to enter a magnetized state. In such a state, the locus of an electron beam is changed by the magnetic field, giving rise to a deteriorating color and raster distortion.

In order to solve the problem described above, we know that some display devices employing a CRT are equipped with a demagnetizing coil (also called a degauss coil) provided around the CRT for eliminating the magnetism generated on the CRT and a demagnetizing circuit including a circuit for supplying a demagnetizing current to the demagnetizing coil.

Figure 9:
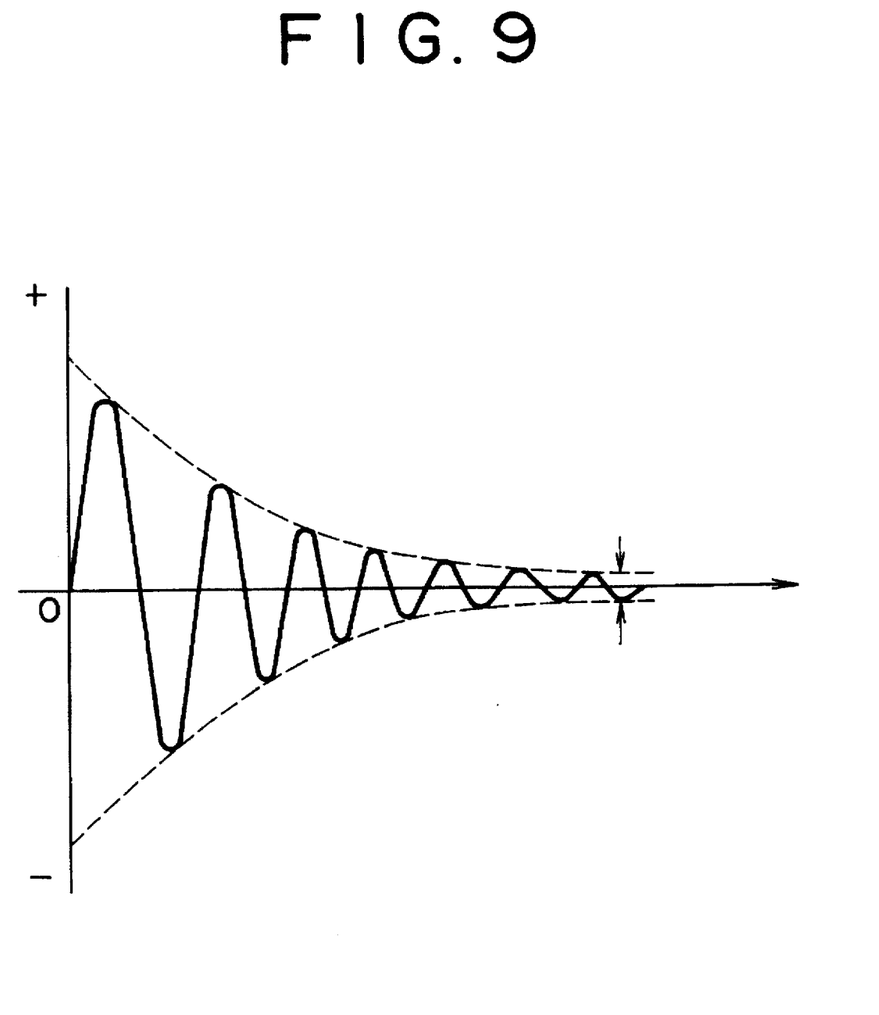
FIG. 9 is a diagram showing a waveform of a current supplied to a demagnetizing coil.

We also know that, in many display devices provided with such a demagnetizing circuit, the demagnetizing circuit always operates automatically at the time the power is turned on. To be more specific, as the power is turned on, an alternating current at a frequency generated by the electric power company is supplied to the demagnetizing coil through a positive thermistor, a thermistor having a positive characteristic. By doing so, a sinusoidal alternating current which gradually attenuates as shown in FIG. 9 is supplied to the demagnetizing coil, causing the CRT to be demagnetized.

By demagnetizing the CRT at the power-on time automatically in this way, it is not necessary any more for the user to carry out an operation to demagnetize the CRT on purpose. On the top of that, when the power is turned on in order to use the display device, the CRT is always demagnetized.

Taking conditions for putting the display device to general use into consideration, however, it is hard to think that the CRT is magnetized as frequently as the power is turned on in the daily operation as part of the usage of the display unit. That is to say, at the present state of the art, the demagnetizing circuit is actually put in an operative state even if it does not have to be or, in other words, in too many cases, the demagnetizing circuit operates wastefully.

For example, a current of the amount of up to typically about 20 to 25 A is supplied to the circuitry of the demagnetizing circuit. With such a current supplied, power is consumed wastefully by the demagnetizing circuit as much as the demagnetizing circuit is put in an operative state wastefully, giving rise to another problem that the lives of components composing the demagnetizing circuit such as the positive thermistor are shortened. In addition, since the CRT is demagnetized at the time the power is turned on, sound generated by the demagnetization is always heard at the power-on time and pictures appearing in the display device vibrate for the first few seconds, providing an uncomfortable feeling to the watcher.

SUMMARY OF THE INVENTION

The present invention addresses the problems described above. According to one aspect of the present invention, a display device is equipped with a demagnetizing circuit for demagnetizing the CRT, a counter for counting the number of operations to turn on the power and a control circuit for putting the demagnetizing circuit in an operative state when it is detected that the contents of the counter exceeds a predetermined value.

In addition, according to another aspect of the present invention, a display device is equipped with a demagnetizing circuit for demagnetizing the CRT and a control circuit for putting the demagnetizing circuit in an operative state when an intermittent supply of the AC power generated by the power company is detected.

In addition, according to still another aspect of the present invention, a display device is equipped with a demagnetizing circuit for demagnetizing the CRT, a timer for measuring the lapse of the absolute time or the lapse of the power-on period to be compared with a predetermined time length and a control circuit for putting the demagnetizing circuit in an operative state when it is detected that the contents of the timer exceeds the predetermined time length.

In addition, according to a still further aspect of the present invention, a display device equipped with a demagnetizing circuit for demagnetizing the CRT is further provided with a movement detecting unit capable of detecting the movement of the main body of the display device and a control circuit for putting the demagnetizing circuit in an operative state in accordance with detection information output by the movement detecting unit.

In addition, according to a still further aspect of the present invention, a display device equipped with a demagnetizing circuit for demagnetizing the CRT is further provided with a magnetic field detecting unit capable of detecting a magnetic field generated outside the main body of the display device and a control circuit for putting the demagnetizing circuit in an operative state in accordance with detection information output by the magnetic field detecting unit, wherein a message is displayed, prompting the user to take an action to eliminate the external source generating the magnetic field in accordance with detection information outputted by the magnetic field detecting unit.

In addition, according to a still further aspect of the present invention, a display device equipped with a demagnetizing circuit for demagnetizing the CRT is further provided with a magnetism detecting unit capable of detecting the amount of residual magnetism remaining in the CRT and a control circuit for putting the demagnetizing circuit in an operative state in accordance with detection information output by the magnetism detecting unit.

According to the configurations of the display device described above, only when a condition assuming that the CRT is magnetized exists, or only when the CRT is detected to be actually in a magnetized state does the demagnetizing circuit operate, allowing the number of wasteful demagnetization operations to be reduced and the CRT to be demagnetized with appropriate timing.

On the top of that, the message displayed in accordance with the detection information output by the magnetic field detecting unit can prompts the user to remove the external source which is magnetizing the CRT.

DETAILED DESCRIPTION OF THE PREFERRED EMBODIMENTS

Figure 1:
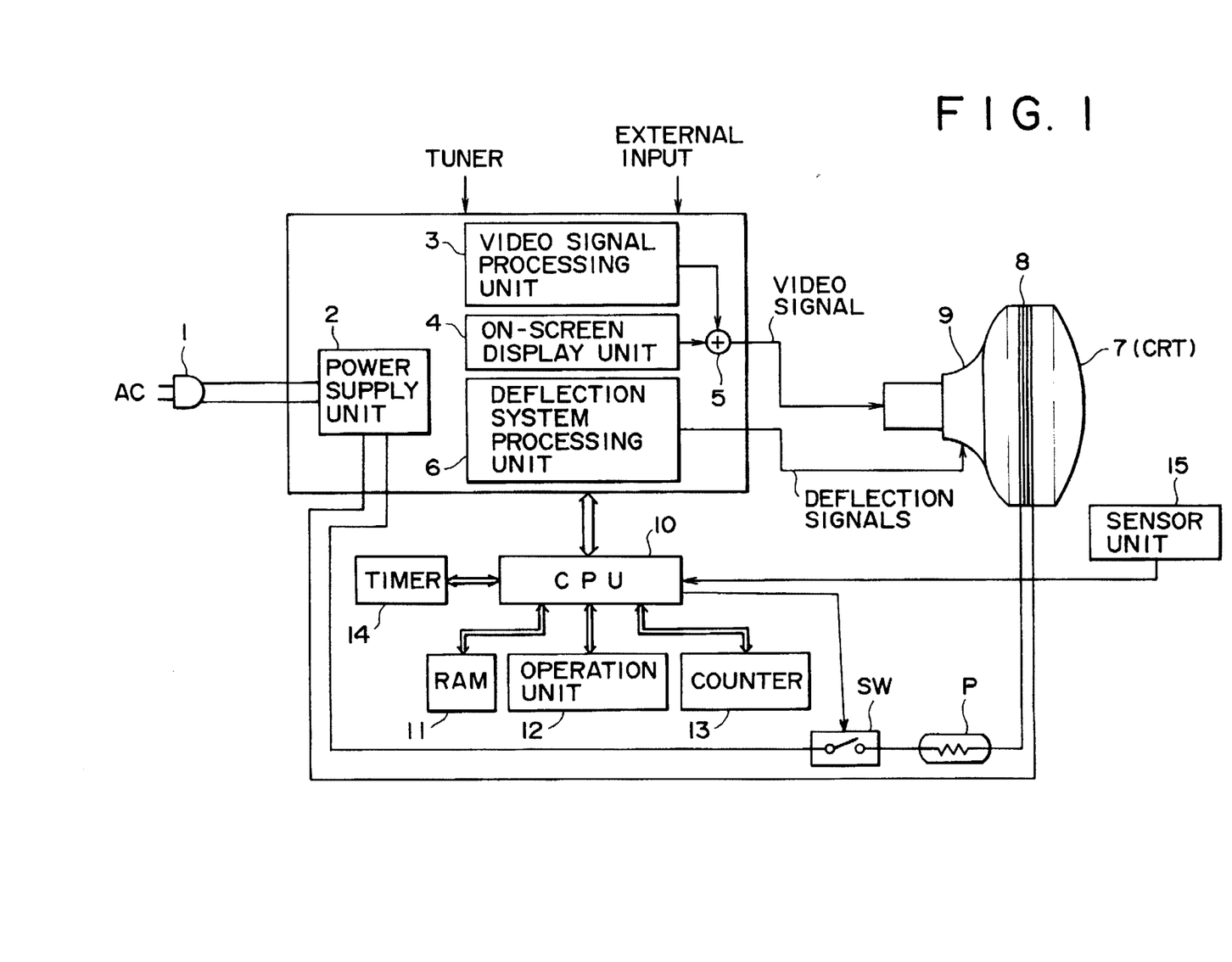
FIG. 1 is a block diagram of the configuration of an embodiment provided by the present invention.

FIG. 1 shows a rough configuration of an embodiment implementing a display device in accordance with the present invention as applied to a television receiver.

Reference numeral 1 shown in the figure is an AC plug for inputting a current of power generated by an electric power company. Reference numeral 2 is a power supply unit for generating DC voltages from the AC power generated by the electric power company which is supplied through the AC plug 1. The DC voltages are applied to functional circuit units each represented by a block shown in the figure, supplying power thereto. In addition, the power supply unit 2 is connected to a demagnetizing coil 8 provided on a CRT 7 through a demagnetizing switch SW and a positive thermistor P, supplying a current for demagnetization to the demagnetizing coil 8. The waveform of the current is shown in FIG. 9.

Reference numeral 3 is a video signal processing unit for carrying out a variety of signal processings on a video signal supplied from a tuner, an external input terminal or the like which is not shown in the figure. Here, a processed video signal is supplied to the CRT 7 through a synthesizer 5 typically as an RGB signal. Reference numeral 4 is an on-screen display unit for outputting another RGB signal with predetermined timing in accordance with the setting of character data or the like by a CPU 10. The synthesizer 5 mixes the RGB signal output by the video signal processing unit 3 with the RGB signal output by the on-screen display unit 4, supplying a synthesized video signal to the CRT 7. In this way, a superimposed display is possible. A deflection system processing unit 6 generates horizontal and vertical deflecting currents in accordance with horizontal and vertical synchronization signals separated by extraction from a signal output by the video signal processing unit 3, supplying the horizontal and vertical deflecting currents to horizontal and vertical deflecting coils 9 respectively.

At the CRT 7, the demagnetizing coil 8 is installed around a shadow mask whereas the horizontal and vertical deflecting coils 9 for deflecting an electronic beam are provided on a funnel portion.

Reference numeral 10 is the CPU cited above for controlling the functional circuit units. The CPU 10 is typically implemented by a microcomputer or the like. In the case of the present embodiment, the demagnetization of the CRT 7 is executed when predetermined conditions prevail as will be described later.

Reference numeral 11 is a RAM unit for storing and holding various kinds of data whereas reference numeral 12 is an operation unit for use by the user for carrying out a variety of operations. It should be noted that a remote controller not shown in the figure can also be employed as well in place of the operation unit 12. Reference numeral 13 is a counter for counting the number of operations to turn on the power as will also be described later.

Reference numeral 14 is a timer for measuring the lapse of the absolute time or the lapse of the power-on period as will be described later. A sensor unit 15 supplies detection signals representing results of detection of the movement of the display device's main body, the amount of magnetism and other quantities to the CPU 10 which serves as a control unit. The control unit 10 puts the demagnetizing circuit in an operative state in accordance with the detection signals. Details of the timer 14 and the sensor unit 15 will be explained in the description of other embodiments.

The demagnetizing circuit employed in the present embodiment comprises a series circuit composed of the demagnetizing coil 8, the demagnetizing switch SW and the positive thermistor P, and the power supply unit connected to the series circuit. When the demagnetizing switch SW is turned on by the control unit 0, for example, AC power generated by the electric power company is supplied to the demagnetizing circuit through the power supply unit 2. Since the resistance value of the positive thermistor P increases with temperature, a demagnetizing current flowing through the demagnetizing coil 8 attenuates as shown in FIG. 9. In a few seconds, the demagnetizing current reaches a level of zero, completing the demagnetization.

The demagnetization is carried out by the embodiment by putting the demagnetizing circuit in an operative state whenever the number of operations to turn on the power reaches a predetermined value. In the case of a normal usage, for example, the amount of accumulated magnetism resulting within a short period to watch the television receiver which period has been lapsing since the power was turned on does not have an effect on pictures.

With the present embodiment, the number of operations to demagnetize the CRT wastefully can therefore be reduced as compared with a case in which the demagnetizing circuit is put in an operative state each time the power is turned on. The amount of consumed power can also be reduced accordingly.

In the case of the present embodiment, the number of operations to turn on the power for which the demagnetizing circuit is to be put in an operative state is set at an arbitrary value. The arbitrary value is determined by considering a period of accumulating magnetism in an average CRT which accumulated magnetism has actually an effect on pictures. The number of operations to turn on the power for which the demagnetizing circuit is to be put in an operative state can be set in advance, or as an alternative, can also be set arbitrarily by the user.

Figure 2:
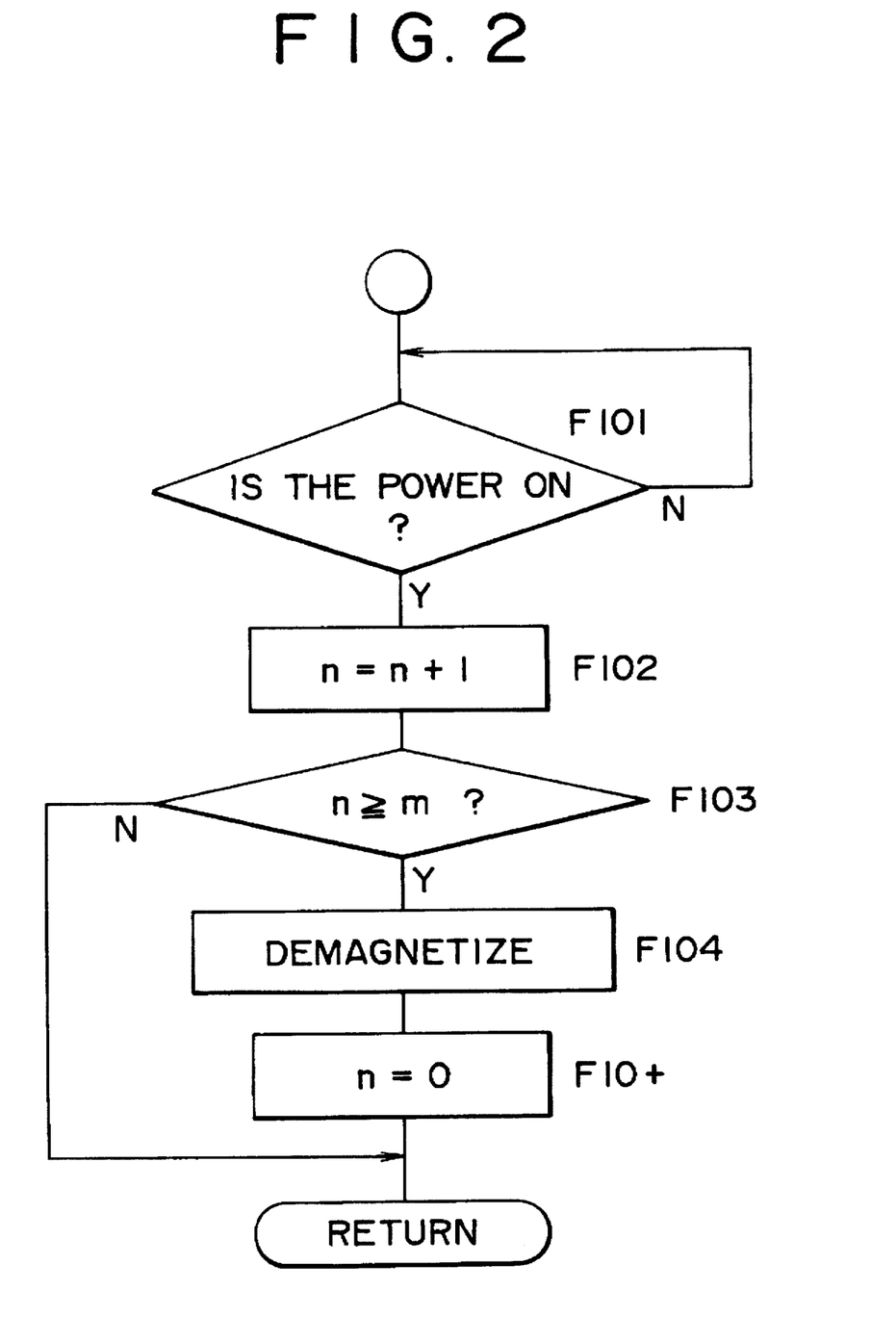
FIG. 2 is a flowchart of processing operations to demagnetize the CRT of the embodiment.

FIG. 2 is a flowchart of processing operations carried out by the CPU 10 to put the demagnetizing circuit of the present embodiment in an operative state. At a first step F101 of this routine, the power is in an off state and the control unit 10 is waiting for the power to be turned on. As the power is turned on by the user by, for example, operating the operation unit 12, the processing flow proceeds to a step F102 to increment a count value n of the counter 13 representing the number of operations to turn on the power. The counter 13 counts up the number of operations to turn on the power, incrementing the count value n by one (n=n+1). The incremented count value n is stored in the RAM unit 11.

Then, the processing flow continues to a step F103 to find out whether or not the count value n stored in the RAM unit 11 is equal to or greater than a constant m set to represent the number of operations to turn on the power for which the demagnetizing circuit is to be put in an operative state (n≧m) or, in other words, to find out whether or not the power has been turned on a number of times equal to or greater than the constant m set to represent the number of operations to turn on the power for which the demagnetizing circuit is to be put in an operative state. It should be noted that the constant m is also stored in advance in the RAM unit 11 and preserved therein. If n is found smaller than m at the step F103, the demagnetizing circuit is not operated and the processing flow returns to the main routine with the values of n remaining unchanged. This processing is repeated till n becomes equal to or greater than m.

If n is found greater than m (n≧m) at the step F103, on the other hand, the processing flow continues to a step F104 at which the CPU 10 turns on the demagnetizing switch SW. With the demagnetizing switch SW turned on, a demagnetizing current is supplied to a coil 8 through the positive thermistor P to demagnetize the CRT 7 as described earlier. Later on, the processing flow returns to a step F105 to reset the count value n of the counter 13 to a zero (n=0) before returning to the main routine.

If data stored in the RAM unit 11 is lost for some reasons, however, it is desirable to take a step so as to always put the demagnetizing circuit in an operative state, for example, when the power is turned on for the first time since the data stored in the RAM unit 11 was lost.

Figure 3:
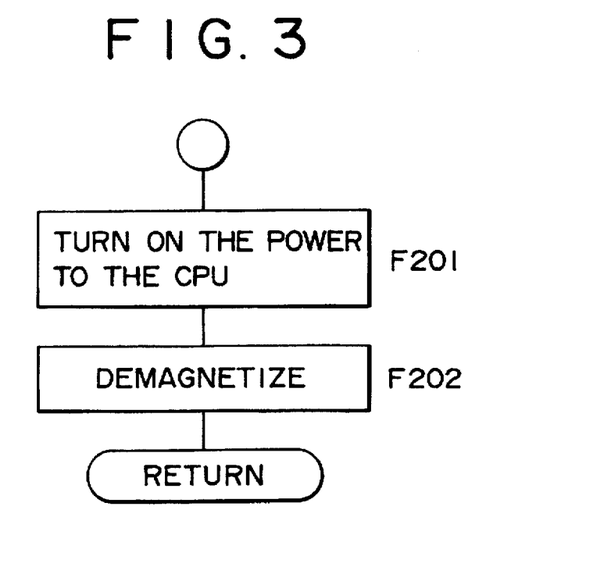
FIG. 3 is a flowchart of processing operations to demagnetize the CRT of another embodiment.

Next, another embodiment provided by the present invention is explained by referring to a flowchart shown in FIG. 3. It should be noted that its display device can have the same circuit configuration as that shown in FIG. 1 for the embodiment described previously.

In the case of this embodiment, demagnetization is carried out when the AC plug 1 is reinserted into the receptacle after it was once pulled out therefrom. When the display device equipped with a CRT is moved to another place, for example, there is possibility that the CRT itself is magnetized by effects of the earth magnetism or magnetism of other display devices. The AC plug 1 is pulled out and reinserted from and into the receptacle most likely because the main body of the display device is moved. For this reason, the present embodiment is designed into such a configuration that magnetic fields developed on the CRT after the movement of the main body of the display device are demagnetized.

When the AC plug 1 is pulled out from the receptacle, causing no power generated by the electric power company to be supplied to the power supply unit 2, for example, the supply of power to the CPU 10 is also terminated as well. As the AC plug 1 is inserted into the receptacle again, power is resupplied to the CPU 10. The CPU 10 detects this state at a step F201 of the flowchart shown in FIG. 3, causing the processing flow to proceed to a step F202, at which the demagnetizing switch SW is turned on and the demagnetizing circuit is put in an operative state, before returning to the main routine.

Next, a still another embodiment is explained. In the case of this embodiment, the timer 14 shown in FIG. 1 measures the lapse of the absolute time or the lapse of the power-on period. When the time measured by the timer 14 exceeds a predetermined time, the demagnetizing circuit is put in an operative state. That is to say, in this embodiment, the predetermined time is set by considering a period of accumulating magnetism in an average CRT, which accumulated magnetism has actually an effect on pictures, in an attempt to carry out demagnetization.

Figure 4:
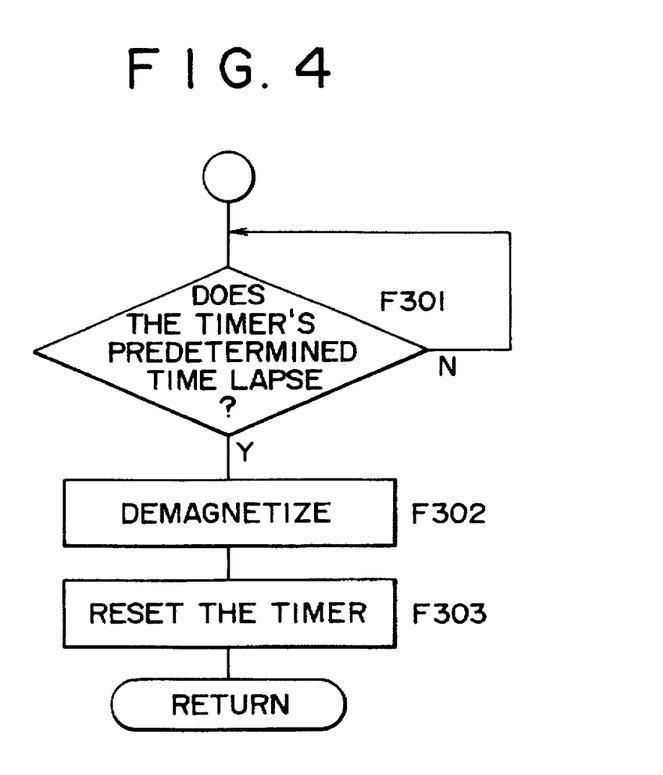
FIG. 4 is a flowchart of processing operations to demagnetize the CRT of still another embodiment.

Processing operations carried out by the CPU 10 in this embodiment are shown in FIG. 4. As shown in the figure, at a step F301, the timer 14 is in a state waiting for the lapse of time to exceed the predetermined time. As the lapse of time exceeds the predetermined time, the processing flow continues to a step F302 to turn on the demagnetizing switch SW in order to demagnetize the CRT. The processing flow then proceeds to a step F303 to reset the measured time in the timer 14 before returning to the main routine.

In an embodiment to be explained next, a sensor unit 15 is provided for detecting movement of the main body of the display device. When the sensor unit 15 detects actual movement of the main body of the display device, the CRT is demagnetized.

Figure 8A:
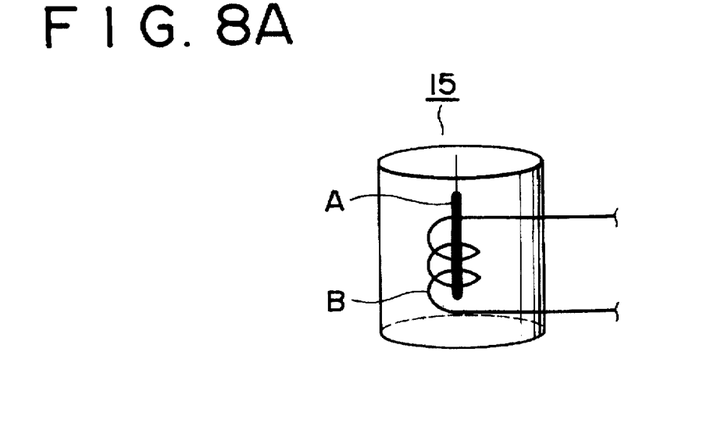
FIGS. 8A to 8C are diagrams showing typical sensor units for movement detection.
Figure 8B:
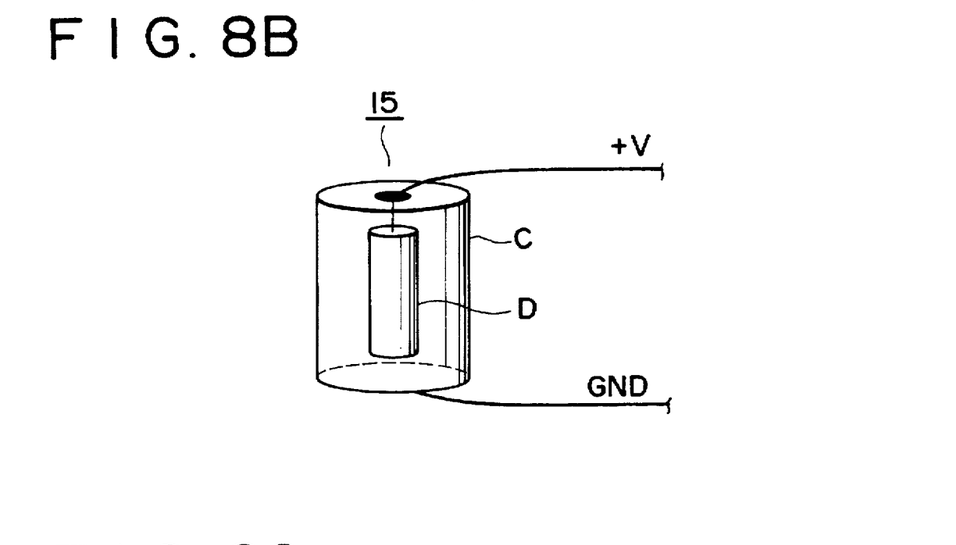
Figure 8C:
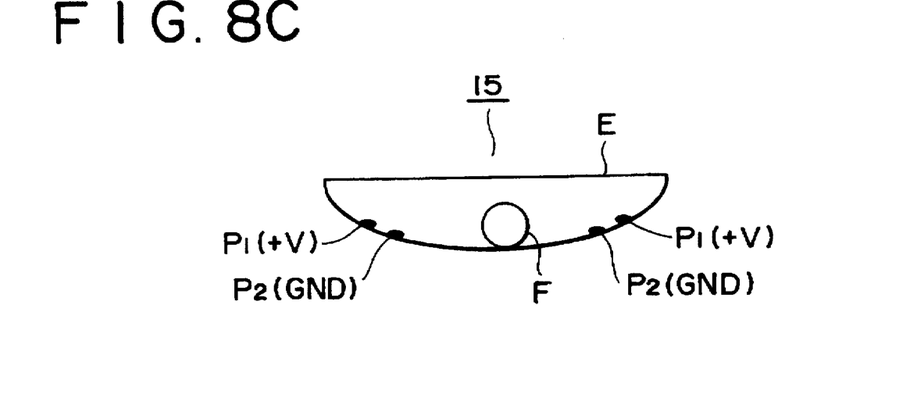

Sensors shown in FIGS. 8A to 8C can be considered as typical ones to be provided as the sensor unit 15 besides a gyro element. FIG. 8A shows a metal rod A suspended inside the coil of an inductor B which metal rod A serves as a detecting element. With such an arrangement, when the display device is actually moved, the metal rod A swings, changing the inductance value of the inductor B. The change in inductance is, in turn, detected as a movement of the display device.

In the case of a sensor unit 15 shown in FIG. 8B, a cylindrical conductor D is suspended inside a cylindrical conductor C in such a way that the conductors C and D are normally insulated from each other. Typically, the conductors C and D are connected to a positive pole line (+V) and a ground line (GND) respectively. With such an arrangement, when the display device is actually moved, the conductor D swings, being brought into contact with the conductor C. As a result, the positive pole line (+V) and the ground line (GND) enter a conductive state, signaling the detection of a movement by the display device.

FIG. 8C is a diagram showing a cross section of a sensor unit 15. As shown in the figure, a spherical conductor F is put inside a plate-like container E. In addition, a ring-shaped positive pole line electrode $P_1$ and a ring-shaped ground line electrode $P_2$ are provided on the inner surface of the container E, being separated from each other by a gap. With such an arrangement, when the display device is actually moved, giving rise to a shaking, the conductor F rolls over the inner side of the container E. As the conductor F rolls into the gap between the electrodes $P_1$ and $P_2$, extending itself over both the electrodes $P_1$ and $P_2$, the conductor F comes into contact with them at the same time. At that time, the positive pole line (+V) and the ground line (GND) enter a conductive state, signaling the detection of a movement by the display device.

The sensor units 15 shown in FIGS. 8A to 8C are typical examples. It should be noted, however, that another sensor can also be employed as well as long as it can detect a shaking or a swing caused by a movement of the display device. In addition, the degree of detection sensitivity can be calibrated by considering a display device movement which is assumed to be able to actually cause a substantial amount of magnetism to be generated.

Figure 5:
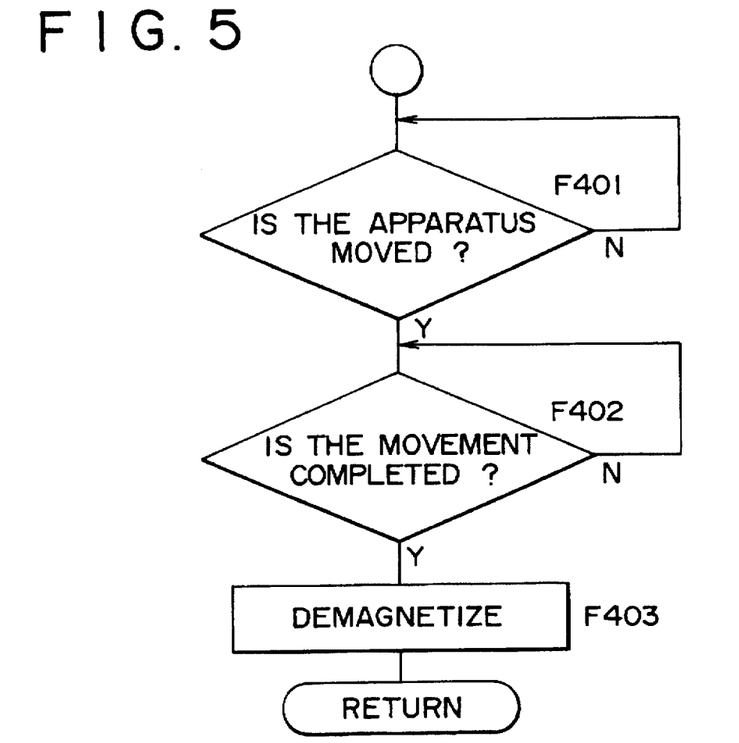
FIG. 5 is a flowchart of processing operations to demagnetize the CRT of a still further embodiment.

Processing operations carried out by the CPU 10 in this embodiment are shown in FIG. 5. As shown in the figure, at a step F401, when a detection signal generated by the sensor unit 15 to indicate a movement by the main body of the display device is detected, the processing flow proceeds to a step F402 to wait for the movement of the display device to be completed. The waiting state entered at the step F402 is required because, if the demagnetizing circuit is put in an operative state right after the movement of the display device is detected, there is possibility that the user is still moving the display device. The completion of the movement by the display device is determined by typically waiting for a predetermined time to lapse since the operation to output the detection signal for indicating the movement of the display device has been terminated. As the completion of the movement by the display device is determined, the processing flow proceeds to a step F403 to put the demagnetizing circuit in an operative state in order to demagnetize the CRT. The processing flow then returns to the calling routine.

It should be noted that, at the step F402, the CPU 10 can also be put in a state typically waiting for the power to be turned on. In this case, the demagnetizing circuit is put in an operative state when the power is turned on for the first time since the display device was moved.

By the way, if a speaker or another kind of electronic equipment is placed in close proximity to the main body of the display device, the CRT may be magnetized by the effect of a magnetic field generated by such equipment. In order to solve this problem, the present invention provides a still further embodiment to be explained as follows. In the case of this embodiment, a magnetic sensor serving as the magnetic unit 15 is provided at such a location inside or outside the display device that a magnetic field external to the main body of the display device can be detected by the magnetic sensor. An external magnetic field detected by the magnetic sensor indicates that the CRT is most likely magnetized, making it necessary to carry out demagnetization. A Hall effect device is typically used as the magnetic sensor. It is also possible to employ a coil provided on the front surface of the main body of the display device wherein an external magnetic field is detected by observing a change in current flowing through the coil due to the effect of the external magnetic field.

In addition, in such a case, a magnetic field is generated at places in close proximity to the main body of the display device as before resulting in magnetism again even after the CRT has been demagnetized. In such a case, the demagnetizing operation can be repeated uselessly. Even though it is necessary to remove these sources of magnetic fields, the user may not be aware of the magnetism by the effects of the external magnetic fields. For this reason, in the case of this embodiment, an instructive message is displayed on the screen to prompt the user to remove things that may cause the CRT to be magnetized. It should be noted that the instructive message can be displayed in an arbitrary format as a text, an icon or the like. In addition, the instructive message to remove sources generating magnetic fields can be accompanied by warning sound at the same time.

Figure 6:
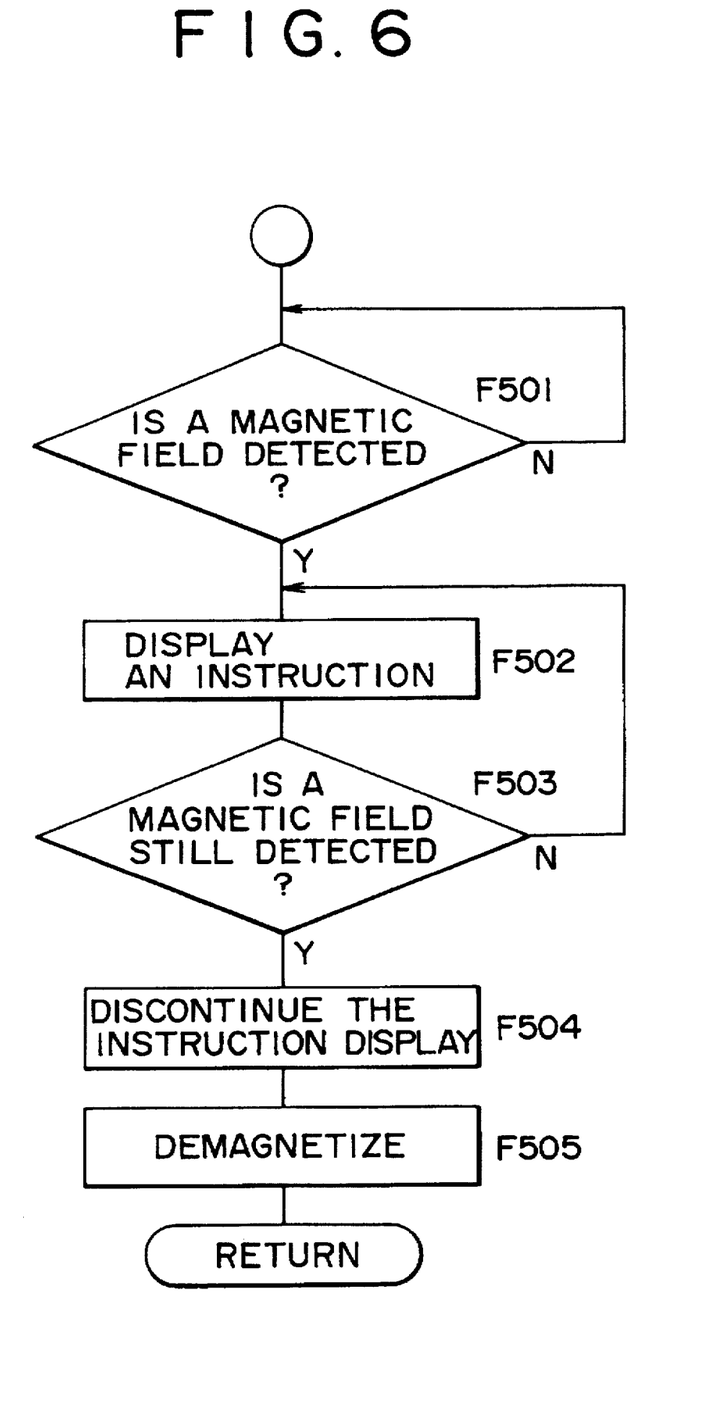
FIG. 6 is a flowchart of processing operations to demagnetize the CRT of a still further embodiment.

FIG. 6 is a flowchart of processing operations carried out by the CPU 10 to demagnetize the CRT of a still further embodiment. This routine begins with a step F501 to determine whether or not an external magnetic field has been detected by a magnetic sensor which serves as the sensor unit 15. If an external magnetic field has been detected, the processing flow proceeds to a step F502 at which the CPU 10 controls the operation to output the instructive message described above. For this reason, in the case of this embodiment, the instructive message is stored and preserved as character data in advance in a ROM unit which is typically embedded in the CPU 10. It should be noted that the ROM unit itself is not shown in the figure. At the step F502, the on-screen display unit 4 is controlled in accordance with the character data. The on-screen display unit 4 supplies a video signal to the CRT 7 through the synthesizer 5 in order to display the instructive message. At that time, if another video signal is supplied by the video signal processing unit 3, the instructive message is displayed by superimposing it on pictures supplied by the video signal processing unit 3.

Then, the processing flow of the CPU 10 continues to a step F503 to find out whether or not the external magnetic fields are no longer detected or the sources generating the magnetic fields have been removed away from the display device. If the external magnetic fields are still detected, the processing flow returns to the step F502 to display the instructive message. If the external magnetic fields are no longer detected or the sources generating the magnetic fields have been removed away from the display device, on the other hand, the processing flow continues to a step F504 to discontinue the operation to display the instructive message. The processing flow then continues to a step F505 to put the demagnetizing circuit in an operative state before returning to the main routine.

In the case of a still further embodiment to be explained next, much like the embodiment described above, a magnetic sensor is employed as the sensor unit 15. In the present embodiment, however, the quantity of residual magnetism left in the CRT 7 is the object of detection. That is to say, depending upon a variety of usage conditions of the display device, the CRT 7 may be magnetized, resulting in an amount of accumulated magnetism even in the normal usage. Here, a quantity of magnetism accumulated in the CRT 7 which amount has an effect on actually displayed pictures is set. If the detected amount exceeds the set quantity, the CRT 7 is demagnetized.

Figure 7:
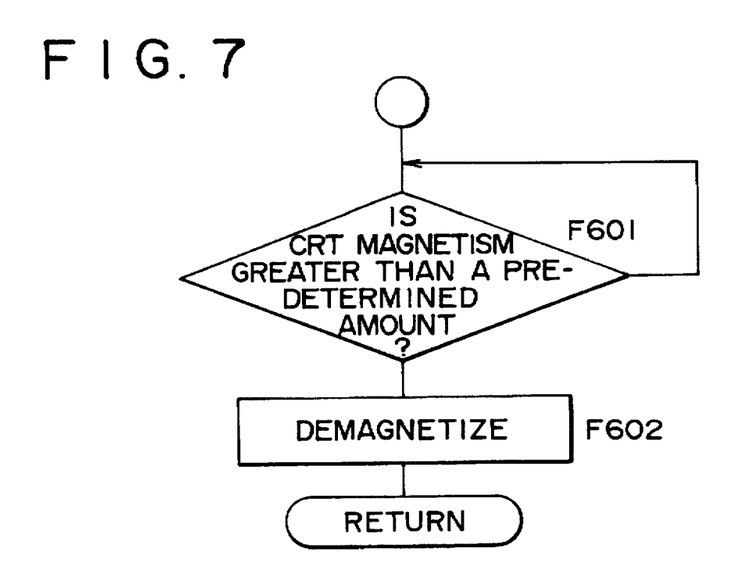
FIG. 7 is a flowchart of processing operations to demagnetize the CRT of a still further embodiment.

In the case of this embodiment, processing operations are carried out by the CPU 10 in accordance with a flowchart shown in FIG. 7. As shown in the figure, the flowchart begins with a step P601 to determine whether or not the amount of magnetism accumulated in the CRT 7 as indicated by detection information output by the magnetic sensor unit 15 exceeds the set quantity. If the amount of magnetism accumulated in the CRT 7 exceeds the set quantity, the processing flow continues to a step F602 to put the demagnetizing circuit in an operative state before returning to the calling routine.

By the way, the embodiments of the present invention described so far can be used individually or used as a combination among the embodiments which combination is composed in accordance with a variety of conditions. In this way, the number of wasteful demagnetizing operations can be reduced as much as possible and, on the top of that, appropriate timing of the demagnetizing operation can be obtained at a more detailed balance.

In addition, a combination pattern of demagnetizing operations according to the embodiments described above can be selected arbitrarily or set in advance. As a possible alternative, the user can select and preset the combination pattern.

The description of the embodiments described above, only a television receiver employing a CRT is explained. Note, however, that it is needless to say that the scope of the present invention includes the monitor unit of a computer and any other display device employing a CRT.

As described above, the display device provided by the present invention is designed so that the magnetizing circuit thereof is put in an operative state in accordance with results of detecting the number of operations to turn on the power, the lapse of time under a predetermined condition since the pulling-out of the AC plug, the movement of the main body of the display device, the existence of external magnetic fields and the amount of residual magnetism in the CRT itself. Unlike the conventional technique, demagnetization is not carried out each time the power is turned on. Instead, the demagnetization is performed only if necessary under certain conditions, giving rise to an effect that the problem of wasteful power consumption is solved accordingly. On the top of that, the number of cases in which sound and picture vibration are generated due to a demagnetizing operation carried out right after the turning-on of the power is reduced, resulting in a product easy to handle by the user. In addition, the lives of the components composing the demagnetizing circuit such as the positive thermistor can be prolonged.

In addition, in the case of a configuration wherein demagnetization is carried out after detecting a magnetic field external to the main body of the display device, an instructive message is displayed to prompt the user to take away a source generating the external magnetic field. In this way, the user becomes aware of the cause of the magnetism, disposing the cause of the problem.

On the top of that, in the case of a usage wherein the possibility of the magnetism generated in the CRT is extremely high, the decision as to whether or not the demagnetization is to be carried out is based on a predetermined criterion according to the present invention, allowing the pictures to be always displayed in an all but stable state without being affected by the magnetism of the CRT. An example of such a case is the use of a plurality of display devices separated from each other by a narrow gap.

What is claimed is:

1. A display device comprising:

demagnetizing means for demagnetizing a CRT;

counting means for counting a number of power-on operations;

means for setting a predetermined value of the number of power-on operations considered to result in an accumulated magnetism in an average CRT sufficient to have an effect on CRT performance; and control means for turning on said demagnetizing means when an output of said counting means exceeds said predetermined value.

2. A display device comprising:

demagnetizing means for demagnetizing a CRT;

motion detecting means including a sensor unit having two parts moveable relative to each other for effecting a change in one of inductance and resistance of the sensor unit and responsive to said change for detecting movement of a main body of said display device;

control means for turning on said demagnetizing means in response to detection information output by said motion detecting means; and magnetism detecting means for detecting a magnetic field external to the main body of said display device and wherein said control means turns on said demagnetizing means in response to information output by said magnetism detecting means.

3. A display device according to claim 2, further comprising message displaying means for displaying a message to prompt a user of the display device to remove a cause of said magnetic field external to the main body of said display device in response to information output by said magnetism detecting means.

4. A display device according to claims 2 or 3, further comprising an additional magnetism detecting means provided for detecting residual magnetism on said CRT and wherein said control means turns on said demagnetizing means in response to information output by said additional magnetism detecting means.

* * * * *